(12) United States Patent
Fuqua et al.

(10) Patent No.: US 8,820,294 B2
(45) Date of Patent: *Sep. 2, 2014

(54) FUEL INJECTION SPRAY PATTERNS FOR OPPOSED-PISTON ENGINES

(75) Inventors: Kevin B. Fuqua, San Diego, CA (US); Fabien G. Redon, San Diego, CA (US); Huixian Shen, Southfield, MI (US); Michael H. Wahl, Bonita, CA (US)

(73) Assignee: Achates Power, Inc., San Diego, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 13/136,954

(22) Filed: Aug. 15, 2011

(65) Prior Publication Data

US 2012/0073541 A1   Mar. 29, 2012

Related U.S. Application Data

(63) Continuation-in-part of application No. 13/066,589, filed on Apr. 18, 2011.

(60) Provisional application No. 61/401,598, filed on Aug. 16, 2010.

(51) Int. Cl.
| | |
|---|---|
| *F02B 31/00* | (2006.01) |
| *F16C 33/04* | (2006.01) |
| *F02B 23/06* | (2006.01) |
| *F01B 7/12* | (2006.01) |
| *F02B 75/28* | (2006.01) |
| *F02B 75/04* | (2006.01) |
| *F02B 75/32* | (2006.01) |
| *F01B 7/02* | (2006.01) |
| *F01B 7/08* | (2006.01) |

(52) U.S. Cl.
CPC . *F01B 7/08* (2013.01); *F16C 33/04* (2013.01); *F02B 23/0645* (2013.01); *F02B 23/0651* (2013.01); *F01B 7/12* (2013.01); *F02B 2275/48* (2013.01); *F02B 75/28* (2013.01); *F02B 75/04* (2013.01); *F02B 75/32* (2013.01); *Y02T 10/125* (2013.01); *F02B 23/0633* (2013.01); *F02B 23/0678* (2013.01); *F02B 23/0663* (2013.01); *F02B 23/063* (2013.01); *F01B 7/02* (2013.01); *F02B 23/0621* (2013.01); *F02B 23/0624* (2013.01); *F02B 75/282* (2013.01); *F02B 23/0675* (2013.01)

USPC ............ 123/301; 123/51 B; 123/299

(58) Field of Classification Search
CPC ........... F02B 23/104; F02B 23/0618; F02B 23/0621; F02B 23/0624; F02B 23/0633; F02B 23/0639; F02B 23/0675; F02B 23/0678; F02B 23/069; F02B 23/0693; F02B 75/28; F02B 75/282; F02B 7/02; F02B 25/08; F02F 3/26; F02F 3/28
USPC ........... 123/51 R, 51 B, 51 BA, 51 BD, 53.3, 123/53.6, 55.2, 55.5, 55.7, 73 C, 193.6, 251, 123/261, 262, 279, 285, 289, 290, 299–301, 123/303, 306, 307, 661, 667, 46 R, 276
See application file for complete search history.

(56) References Cited

U.S. PATENT DOCUMENTS

| | | | | |
|---|---|---|---|---|
| 665,475 | A * | 1/1901 | Schweitzer | 432/128 |
| 667,298 | A * | 2/1901 | Cunningham | 74/379 |
| 1,143,408 | A * | 6/1915 | Bernhard | 123/51 B |
| 1,207,799 | A * | 12/1916 | Scheller | 123/51 B |
| 1,312,605 | A * | 8/1919 | Wygodsky | 123/51 BA |
| 1,423,088 | A * | 7/1922 | Crossley et al. | 123/276 |
| 1,464,268 | A * | 8/1923 | Keller | 123/299 |
| 1,486,583 | A * | 3/1924 | Huskisson | 123/51 B |
| 1,515,391 | A * | 11/1924 | Keller | 123/276 |
| 1,523,453 | A | 1/1925 | Lane | |
| 1,582,792 | A * | 4/1926 | Schultz | 123/276 |
| 1,644,954 | A * | 10/1927 | Shearer | 123/51 AA |
| 1,662,828 | A * | 3/1928 | Law | 123/51 BA |
| 1,808,664 | A * | 6/1931 | Koschka | 123/41.35 |
| 1,853,562 | A * | 4/1932 | Herr | 148/212 |
| 1,854,190 | A * | 4/1932 | Herr | 123/299 |
| 1,967,630 | A * | 7/1934 | Rusberg | 423/164 |
| 1,978,194 | A * | 10/1934 | Gray | 123/41.74 |
| 2,014,672 | A * | 9/1935 | Schmaljohann | 123/51 B |
| 2,110,116 | A * | 3/1938 | Alfaro | 123/299 |
| 2,132,083 | A * | 10/1938 | Pescara | 123/275 |

| | | | | | |
|---|---|---|---|---|---|
| 2,173,081 | A | * | 9/1939 | Barkeij | 123/275 |
| 2,196,429 | A | * | 4/1940 | Siciliano | 473/515 |
| 2,337,245 | A | * | 12/1943 | Jacklin | 123/65 VC |
| 2,393,085 | A | * | 1/1946 | Wuehr | 123/51 BD |
| 2,396,429 | A | * | 3/1946 | Krygsman | 123/51 B |
| 2,440,310 | A | * | 4/1948 | Thege | 123/51 R |
| 2,463,418 | A | * | 3/1949 | Pescara | 123/262 |
| 2,530,884 | A | * | 11/1950 | Laraque | 123/41.31 |
| 2,607,328 | A | * | 8/1952 | Jencick | 123/51 BA |
| 2,646,779 | A | * | 7/1953 | Fiser | 123/51 BA |
| 2,682,862 | A | * | 7/1954 | Camner | 123/276 |
| 2,699,156 | A | * | 1/1955 | Karow | 123/51 BA |
| 2,731,003 | A | * | 1/1956 | Morris | 123/51 BA |
| 2,748,757 | A | * | 6/1956 | Morris | 123/51 BA |
| 2,805,654 | A | * | 9/1957 | Jacklin | 123/51 BA |
| 2,853,983 | A | * | 9/1958 | Sawle, Jr. | 123/51 BA |
| 3,033,184 | A | * | 5/1962 | Jackson | 123/65 R |
| 3,117,566 | A | * | 1/1964 | Venediger | 123/51 BA |
| 3,411,289 | A | | 11/1968 | Antonsen et al. | 60/13 |
| 4,090,479 | A | * | 5/1978 | Kaye | 123/306 |
| 4,491,096 | A | * | 1/1985 | Noguchi et al. | 123/51 B |
| 4,872,433 | A | * | 10/1989 | Paul et al. | 123/257 |
| 5,042,441 | A | | 8/1991 | Paul et al. | 123/276 |
| 5,083,530 | A | | 1/1992 | Rassey | 123/51 R |
| 5,261,359 | A | | 11/1993 | Hall | 123/65 V |
| 6,161,518 | A | | 12/2000 | Nakakita et al. | 123/298 |
| 6,170,443 | B1 | | 1/2001 | Hofbauer | 123/51 B |
| 6,182,619 | B1 | | 2/2001 | Spitzer et al. | 123/51 B |
| 6,345,601 | B1 | | 2/2002 | Miyajima et al. | 123/305 |
| 6,443,122 | B1 | * | 9/2002 | Denbratt et al. | 123/301 |
| 6,854,440 | B2 | | 2/2005 | Cathcart et al. | 123/298 |
| 6,874,489 | B2 | | 4/2005 | Yonekawa et al. | 123/661 |
| 6,928,997 | B2 | | 8/2005 | Yu | 123/657 |
| 6,997,158 | B1 | | 2/2006 | Liu | 123/279 |
| 7,210,448 | B2 | | 5/2007 | Stanton et al. | 123/298 |
| 7,438,039 | B2 | | 10/2008 | Poola et al. | 123/193.6 |
| 7,597,084 | B2 | | 10/2009 | Vachon et al. | 123/294 |
| 2005/0066929 | A1 | | 3/2005 | Liu | 123/193.4 |
| 2005/0150478 | A1 | | 7/2005 | Nomura | 123/193.5 |
| 2006/0124084 | A1 | | 6/2006 | Hofbauer et al. | 123/55.7 |
| 2006/0157003 | A1 | | 7/2006 | Lemke et al. | 123/41.38 |
| 2007/0272191 | A1 | | 11/2007 | Tsujimoto et al. | 123/193.5 |
| 2008/0006238 | A1 | | 1/2008 | Hofbauer et al. | 123/208 |
| 2008/0115771 | A1 | | 5/2008 | Elsbett | 123/51 BA |
| 2008/0127947 | A1 | | 6/2008 | Hofbauer et al. | 123/51 R |
| 2009/0139485 | A1 | | 6/2009 | Pontoppidan | 123/305 |
| 2009/0159022 | A1 | | 6/2009 | Chu | 123/52.2 |
| 2010/0006061 | A1 | | 1/2010 | Shibata et al. | 123/307 |
| 2010/0107868 | A1 | | 5/2010 | Scharp et al. | 92/159 |
| 2010/0108044 | A1 | | 5/2010 | Liu | 123/664 |
| 2010/0224162 | A1 | | 9/2010 | Hofbauer | 123/196 R |
| 2010/0282219 | A1 | | 11/2010 | Alonso | 123/51 AA |
| 2011/0041684 | A1 | | 2/2011 | Kortas et al. | 92/255 |
| 2012/0234285 | A1 | | 9/2012 | Venugopal et al. | 123/193.6 |
| 2012/0285418 | A1 | | 11/2012 | Elsbett et al. | 123/300 |

FOREIGN PATENT DOCUMENTS

| | | | | | |
|---|---|---|---|---|---|
| BE | 388676 | | | 5/1932 | |
| BE | 388676 | A | * | 5/1932 | |
| DE | 4335515 | A1 | | 4/1995 | F02B 17/00 |
| DE | 19651175 | A1 | | 6/1998 | F02B 25/08 |
| DE | 10141888 | | | 4/2003 | F02B 3/02 |
| DE | 102004010361 | A1 | | 12/2004 | F02B 75/28 |
| DE | 102006055251 | A1 | | 5/2008 | F02F 3/10 |
| DE | 102008055911 | A1 | | 5/2010 | F02F 3/22 |
| FR | 50349 | | | 6/1939 | |
| FR | 848994 | A | * | 11/1939 | |
| GB | 320439 | A | * | 10/1929 | |
| GB | 531366 | | | 1/1941 | |
| GB | 540658 | A | * | 10/1941 | |
| GB | 552758 | A | * | 4/1943 | |
| GB | 562343 | | | 6/1944 | |
| JP | 52004909 | A | * | 1/1977 | |
| JP | 352004909 | A | | 1/1977 | |
| JP | 2009-138718 | | | 6/2009 | F02D 19/12 |
| SU | 1216394 | A1 | | 3/1986 | F02B 41/04 |
| WO | 01/25618 | A1 | | 4/2001 | F02M 59/08 |
| WO | 2007/006469 | A2 | | 1/2007 | F01L 7/04 |
| WO | WO 2009/061873 | | | 5/2009 | F02B 75/24 |
| WO | 2011/061191 | A1 | | 5/2011 | F01B 7/02 |

OTHER PUBLICATIONS

Hirsch, N.R., et al, SAE Publication 2006-01-0926, "Advanced Opposed Piston Two-stroke Diesel Demonstrator," Apr. 2006.*
Pirault, J-P., et al, *Opposed Piston Engines: Evolution, Use, and Future Applications*, 2010, pp. 231-245.
International Search Report/Written Opinion for PCT/US2012/038061, mailed May 16, 2012.
International Search Report/Written Opinion for PCT/US2011/061381, mailed Apr. 12, 2013.
SAE Publication 2005-01-1548, *Opposed Piston Opposed Cylinder (OPOC) Engine for Military Ground Vehicles*, P. Hofbauer, Apr. 2005.
SAE Publication 2006-01-0277, *Opposed Piston Opposed Cylinder (OPOC) 450 Engine: Performance Development by CAE Simulations and Testing*, M. Franke, et al, Apr. 2006.
*Highly Efficient Opposed Piston Opposed Cylinder (OPOC) Engine*, P. Hofbauer, undated.
International Search Report/Written Opinion for PCT/US2011/001436, mailed Nov. 3, 2011.
Partial International Search Report for PCT/US2011/000692, mailed Aug. 18, 2011.

* cited by examiner

*Primary Examiner* — Mahmoud Gimie
*Assistant Examiner* — John Zaleskas
(74) *Attorney, Agent, or Firm* — Terrance A. Meador (57) ABSTRACT

A combustion chamber for an opposed-piston engine includes a squish zone defined between circumferential peripheral areas of opposing end surfaces of the pistons, a cavity defined by one or more bowls in the end surfaces, and at least one injection port that extends radially through the squish zone into the cavity. The cavity has a cross-sectional shape that imposes a tumbling motion on air flowing from the squish zone into the cavity. Opposing spray patterns of fuel are injected into the combustion chamber. In some aspects, the opposing spray patterns are injected along a major axis of the combustion chamber.

28 Claims, 9 Drawing Sheets

FUEL INJECTION SPRAY PATTERNS FOR OPPOSED-PISTON ENGINES

PRIORITY AND RELATED APPLICATIONS

This application claims priority to U.S. provisional application for patent 61/401,598, filed Aug. 16, 2010. This application is a continuation-in-part of U.S. patent application 13/066,589, filed Apr. 18, 2011.

BACKGROUND

The field is combustion chambers for internal combustion engines. In particular, the field includes constructions for opposed-piston engines in which a combustion chamber is defined between end surfaces of pistons disposed in opposition in the bore of a ported cylinder. More particularly, the field includes opposed-piston engines with combustion chamber constructions that produce a tumbling motion in charge air admitted into the cylinder between the piston end surfaces. Opposing spray patterns of fuel are injected into the combustion chamber. In some aspects, the opposing spray patterns are injected along a major axis of the combustion chamber.

Figure 1:
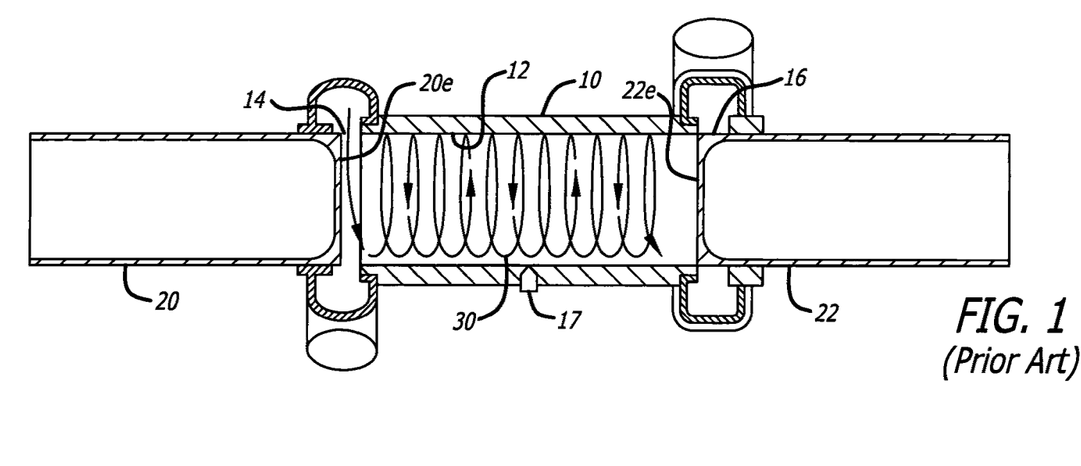
FIG. 1 is a side sectional partially schematic drawing of a cylinder of an opposed-piston engine with prior art opposed pistons near respective bottom dead center locations, and is appropriately labeled "Prior Art".

Per FIG. 1, an opposed-piston engine includes at least one cylinder 10 with a bore 12 and longitudinally-displaced intake and exhaust ports 14 and 16 machined or formed therein. One or more fuel injectors 17 are secured in injector ports (ports where injectors are positioned) that open through the side surface of the cylinder. Two pistons 20, 22 according to the prior art are disposed in the bore 12 with their end surfaces 20e, 22e in opposition to each other. For convenience, the piston 20 is denominated as the "intake" piston because of its proximity to the intake port 14. Similarly, the piston 22 is denominated as the "exhaust" piston because of its proximity to the exhaust port 16.

Operation of an opposed-piston engine with one or more ported cylinders (cylinders with one or more of intake and exhaust ports formed therein) such as the cylinder 10 is well understood. In this regard, in response to combustion the opposed pistons move away from respective top dead center (TDC) positions where they are at their innermost positions in the cylinder 10. While moving from TDC, the pistons keep their associated ports closed until they approach respective bottom dead center (BDC) positions where they are at their outermost positions in the cylinder. The pistons may move in phase so that the intake and exhaust ports 14, 16 open and close in unison. Alternatively, one piston may lead the other in phase, in which case the intake and exhaust ports have different opening and closing times.

In many opposed piston constructions, a phase offset is introduced into the piston movements. For example, the exhaust piston leads the intake piston and the phase offset causes the pistons to move around their BDC positions in a sequence in which the exhaust port 16 opens as the exhaust piston 22 moves through BDC while the intake port 14 is still closed so that combustion gasses start to flow out of the exhaust port 16. As the pistons continue moving away from each other, the intake piston 20 moves through BDC causing the intake port 14 to open while the exhaust port 16 is still open. A charge of pressurized air is forced into the cylinder 10 through the open intake port 14, driving exhaust gasses out of the cylinder through the exhaust port 16. As seen in FIG. 1, after further movement of the pistons, the exhaust port 16 closes before the intake port 14 while the intake piston 20 continues to move away from BDC. Typically, the charge of fresh air is swirled as it passes through ramped openings of the intake port 14. With reference to FIG. 1, the swirling motion (or simply, "swirl") 30 is a generally helical movement of charge air that circulates around the cylinder's longitudinal axis and moves longitudinally through the bore of the cylinder 10. Per FIG. 2, as the pistons 20, 22 continue moving toward TDC, the intake port 14 is closed and the swirling charge air remaining in the cylinder is compressed between the end surfaces 20e and 22e. As the pistons near their respective TDC locations in the cylinder bore, fuel 40 is directly injected through the side of the cylinder ("direct side injection") into the compressed charge air 30 in the bore, between the end surfaces 20e, 22e of the pistons. As injection continues, the swirling mixture of air and fuel is increasingly compressed in a combustion chamber 32 defined between the end surfaces 20e and 22e as the pistons 20 and 22 move through their respective TDC locations. When the mixture reaches an ignition temperature, the fuel ignites in the combustion chamber, driving the pistons apart toward their respective BDC locations.

Turbulence is a desirable feature of charge air motion as fuel injection begins. Turbulence encourages the mixing of charge air with fuel for more complete and more uniform ignition than would otherwise occur. The geometries of the intake port openings and the cylinder of an opposed-piston engine provide a very effective platform for generation of a strong swirling motion of the charge air that promotes both removal of exhaust gasses (scavenging) and charge air turbulence. However, charge air motion that is dominated by swirl can produce undesirable effects during combustion. For example, during combustion in a cylindrical combustion chamber defined between flat piston end surfaces, swirl pushes the flame toward the cylinder bore, causing heat loss to the (relatively) cooler cylinder wall. The higher velocity vectors of swirl occur near the cylinder wall, which provides the worst scenario for heat losses: high temperature gas with velocity that transfers heat to the cylinder wall and lowers the thermal efficiency of the engine. Accordingly, in such opposed-piston engines, it is desirable to maintain charge air turbulence as injection starts while mitigating the undesirable effects produced by swirl.

In certain opposed-piston combustion chamber constructions, turbulence is produced by squish flow from the periphery of the combustion chamber in a radial direction of the cylinder toward the cylinder's axis. Squish flow is generated by movement of compressed air from a relatively high-pressure region at the peripheries of the piston end surfaces to a lower-pressure region generated by a bowl formed in at least one piston end surface. Squish flow promotes charge air turbulence in the combustion chamber. For example, U.S. Pat. No. 6,170,443 discloses a cylinder with a pair of opposed pistons having complementary end surface constructions. A circular concave depression formed in one end surface is symmetrical with respect to the axis of its piston and rises to a point in its center. The periphery of the opposing end surface has a convex shape in the center of which a semi-toroidal (half donut-shaped) trench is formed. As the pistons approach TDC, they define a generally toroidally-shaped combustion chamber centered on the longitudinal axis of the cylinder. The combustion chamber is surrounded by a circumferential squish band defined between the concave and convex surface shapes. As the pistons approach TDC, the squish band generates an inwardly-directed squish flow into the toroidal trench and creates "a swirl of high intensity near top dead center." See the '443 patent at column 19, lines 25-27. Fuel is injected into the toridal combustion chamber in a radial direction of the bore.

Increasing the turbulence of charge air in the combustion chamber increases the effectiveness of air/fuel mixing. Domination of charge air motion by swirl or squish flow alone does achieve a certain level of turbulence. Accordingly, combustion chamber constructions for opposed-piston engines have been proposed that generate a tumble movement in charge air motion. See, for example, the combustion chambers described in commonly-owned US patent application 13/066,589, filed Apr. 18, 2011. In this regard, tumble is a rotating movement of charge air that circulates in a direction that is transverse to the longitudinal axis of the cylinder. Preferably, the tumbling motion is a circulation of charge air that circulates around a diameter of the cylinder bore. This additional element produces even more turbulence of the charge air, and thereby achieves better air/fuel mixing than can be obtained with swirl or squish alone. Now, it is desirable to provide fuel spray patterns that interact well with such complex, turbulent bulk air motion in order to gain better air/fuel mixing in the combustion chamber of an opposed-piston engine.

SUMMARY

Accordingly, it is an object to provide direct side injection of fuel spray patterns in opposing radial directions of a cylinder bore into a combustion chamber of an opposed-piston engine wherein charge air has a complex, turbulent motion. Preferably, the air motion includes swirl and tumble components.

Preferably, the tumbling motion is a circulation of charge air that circulates around a diameter of the cylinder bore.

In some aspects, opposing spray patterns of fuel injected into such a combustion chamber include multi-plume patterns that meet at or near the center of the combustion chamber.

DETAILED DESCRIPTION OF THE PREFERRED CONSTRUCTIONS

Figure 2:
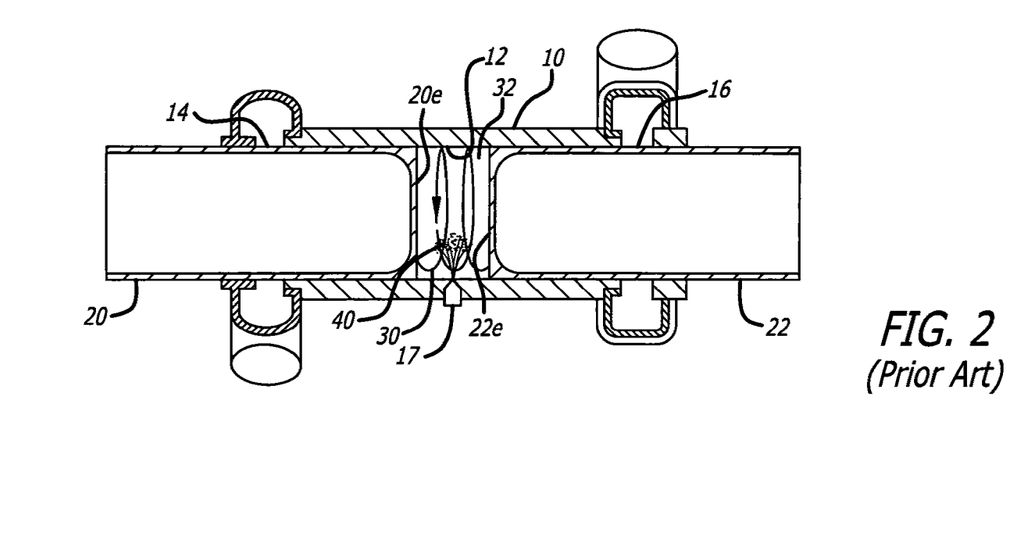
FIG. 2 is a side sectional partially schematic drawing of the cylinder of FIG. 1 with the prior art opposed pistons near respective top dead center locations where flat end surfaces of the pistons define a prior art combustion chamber, and is appropriately labeled "Prior Art".

In the combustion chamber construction to be described, an internal combustion engine includes at least one cylinder with longitudinally-separated exhaust and intake ports; see, for example, the cylinder 10 illustrated in FIGS. 1 and 2. A pair of pistons is disposed in opposition in a bore of the cylinder and a combustion chamber structure is defined between the opposing end surfaces of the pistons as the pistons move toward top dead center positions. A circumferential area defines a periphery on each of the end surfaces. The combustion chamber includes a cavity defined between the end surfaces, and has opposing openings through which fuel is injected (hereinafter an "injection ports") that extend at least generally in a diametrical direction of the cylinder and open into the cavity.

During operation of the internal combustion engine, as the pistons approach TDC, one or more squish zones direct flows of compressed air (called "squish flows") into the combustion chamber in at least one direction that is skewed with respect to a diametrical direction of the bore. This process is referred to as "generating squish". The portions of the end surfaces that generate squish are referred to as squish surfaces, and channels defined, between the squish surfaces are referred to as squish channels. Squish flow is deflected or redirected by one or more curved surfaces in a combustion chamber cavity into at least one tumble motion that circulates in the cavity.

In the following description, "fuel" is any fuel that can be used in an opposed-piston engine. The fuel may be a relatively homogeneous composition, or a blend. For example, the fuel may be diesel fuel or any other fuel ignitable by compression ignition. Further, the descriptions contemplate ignition resulting from compression of an air/fuel mixture; however it may be desirable to provide additional mechanisms, such as glow plugs, to assist compression ignition. The descriptions contemplate injection of fuel into a compressed gas in a combustion chamber when opposed pistons are at or near TDC locations. The gas is preferably pressurized ambient air; however, it may include other components such as exhaust gases or other diluents. In any such case, the gas is referred to as "charge air."

Combustion chamber construction: FIGS. 13-6, 7A, 7B, and 8 illustrate a combustion chamber construction defined by complementary end surface structures of opposed pistons disposed in a ported cylinder of an opposed piston engine. Identical generally symmetrical bowls are formed in the end surfaces of the opposed pistons, and the pistons are rotationally oriented to place complementary curved surfaces of the bowls in opposition in order to maximize the squish surface areas of the squish zone.

The end surface structure of each piston has a periphery surrounding a bowl defining a concave surface. The concave surface includes a first portion curving away from a plane containing the periphery surface toward the interior of the piston and a second portion curving away from the first portion and protruding outwardly in part from the plane. A convex surface opposite the bowl curves away from the periphery and protrudes outwardly from the plane. The convex surface meets the second portion of the concave surface to form a ridge therewith. Preferably, but not necessarily, the bowl has a semi-ellipsoidal shape. The end surface structure is provided on both pistons and the pistons are disposed in the bore of a ported cylinder with their end surfaces oriented to place complementary curved surfaces of the end surface structures in opposition in order to define a combustion chamber. Preferably, but not necessarily, the combustion chamber space defined between these two end surfaces is, or is very close to, an elongated ellipsoidal cylinder, providing a generally symmetrical geometry to reinforce and sustain the tumble motion. In this construction, it is desirable that a pair of injection ports be positioned in opposition on the major axis of the combustion chamber.

Figure 3:
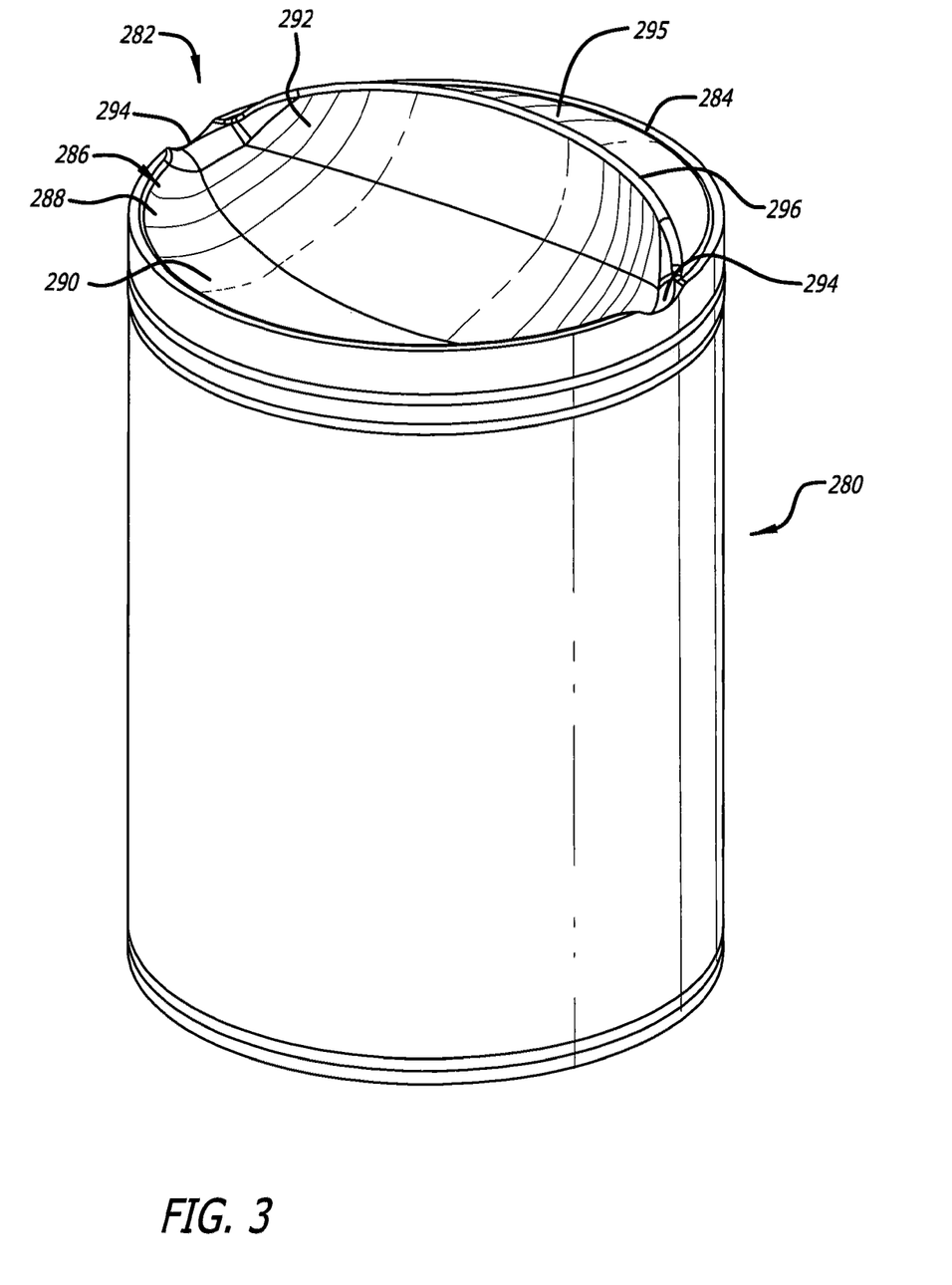
FIG. 3 is an elevational perspective view of a piston of a pair of pistons in which identical end surfaces of the pair of pistons are formed to define a combustion chamber construction.

The structures of the piston end surfaces that define the combustion chamber construction are essentially identical to each other; accordingly, the piston 280 shown in FIG. 3 represents both the intake piston and exhaust piston. The piston 280 has an end surface 282. A flat circumferential area 284 centered on the longitudinal axis of the piston 280 defines a periphery of the end surface 282. A bowl 286 is formed within the periphery. The bowl 286 has a concave surface 288 with a first portion 290 curving inwardly from a plane containing the flat circumferential area 284, toward the interior of the piston 280, and a second portion 292 curving outwardly from the interior of the piston through the plane. The end surface 282 further includes a convex surface 295 within the periphery that curves outwardly from the plane. The convex surface 295 meets the second portion 292 of the concave surface 288 to form a ridge 296 that protrudes outwardly from the end surface 282. At least one notch 294 extends through the periphery into the bowl 286; preferably two aligned notches 294 are provided.

Figure 4:
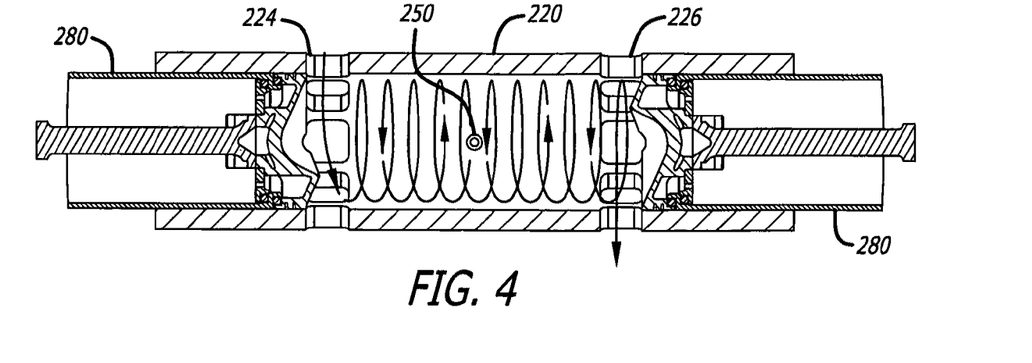
FIGS. 4-6 are side sectional drawings showing an operational sequence of an opposed-piston engine including a pair of pistons according to FIG. 3.
Figure 5:
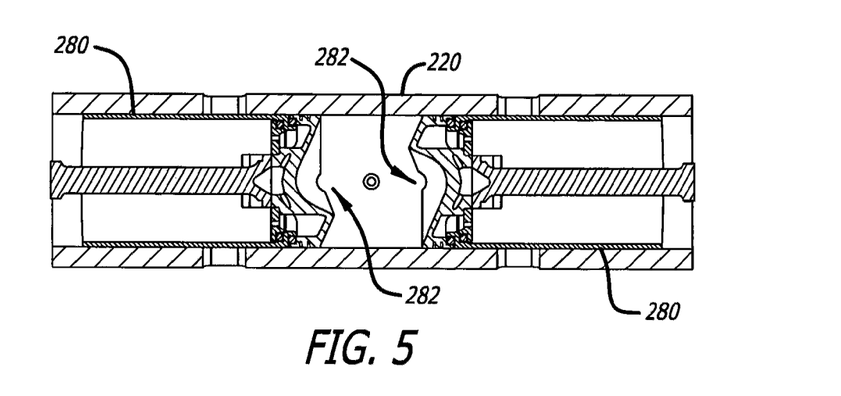
Figure 6:
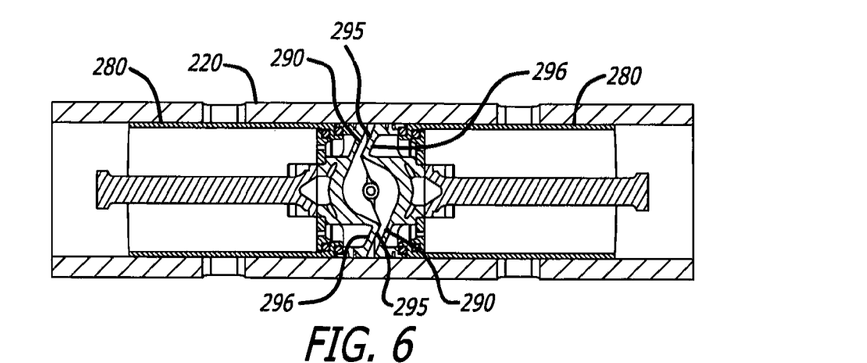
Figure 7A:
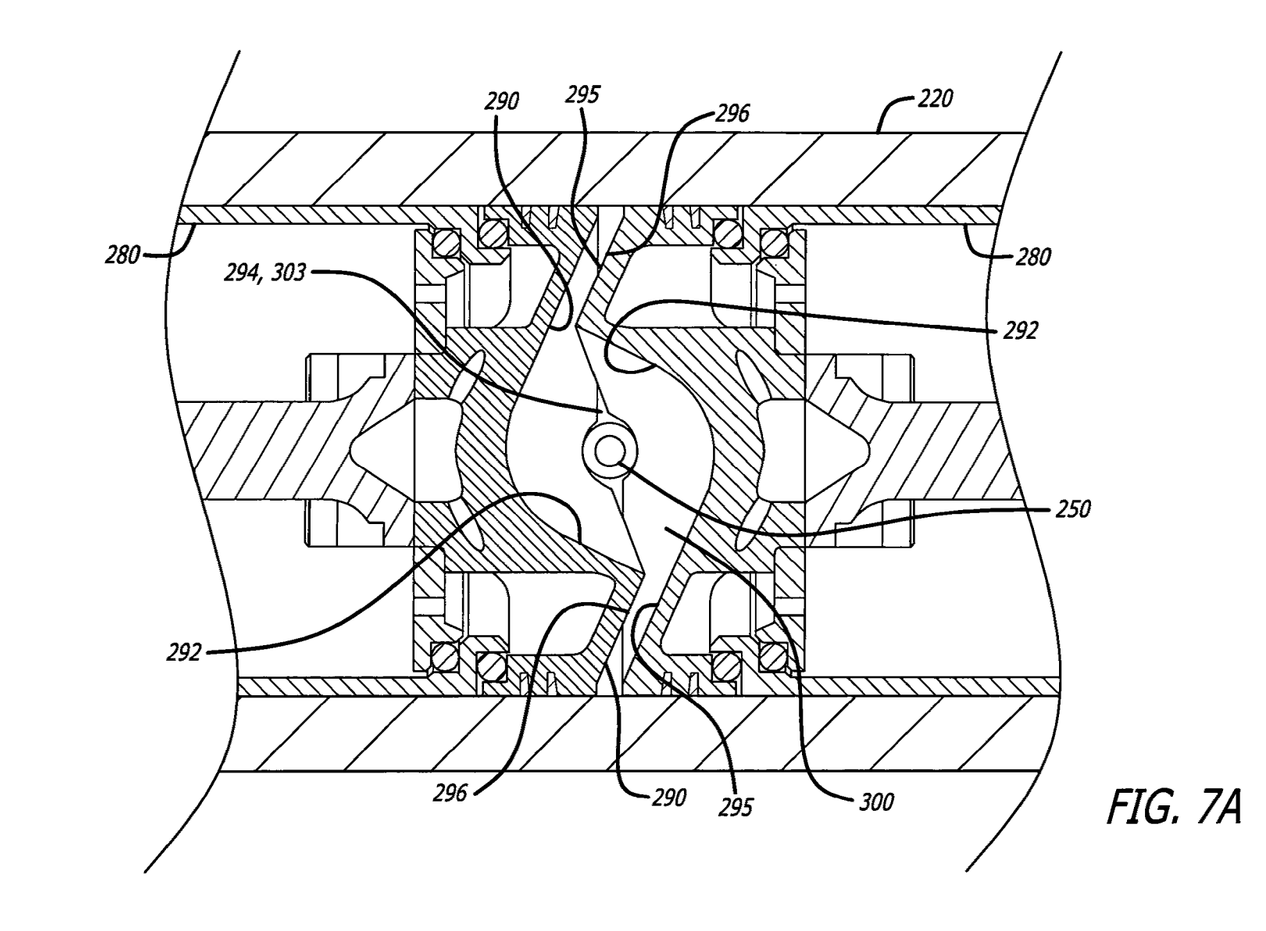
FIG. 7A is an enlarged view of a portion of FIG. 6 showing in greater detail the combustion chamber construction.
Figure 7B:
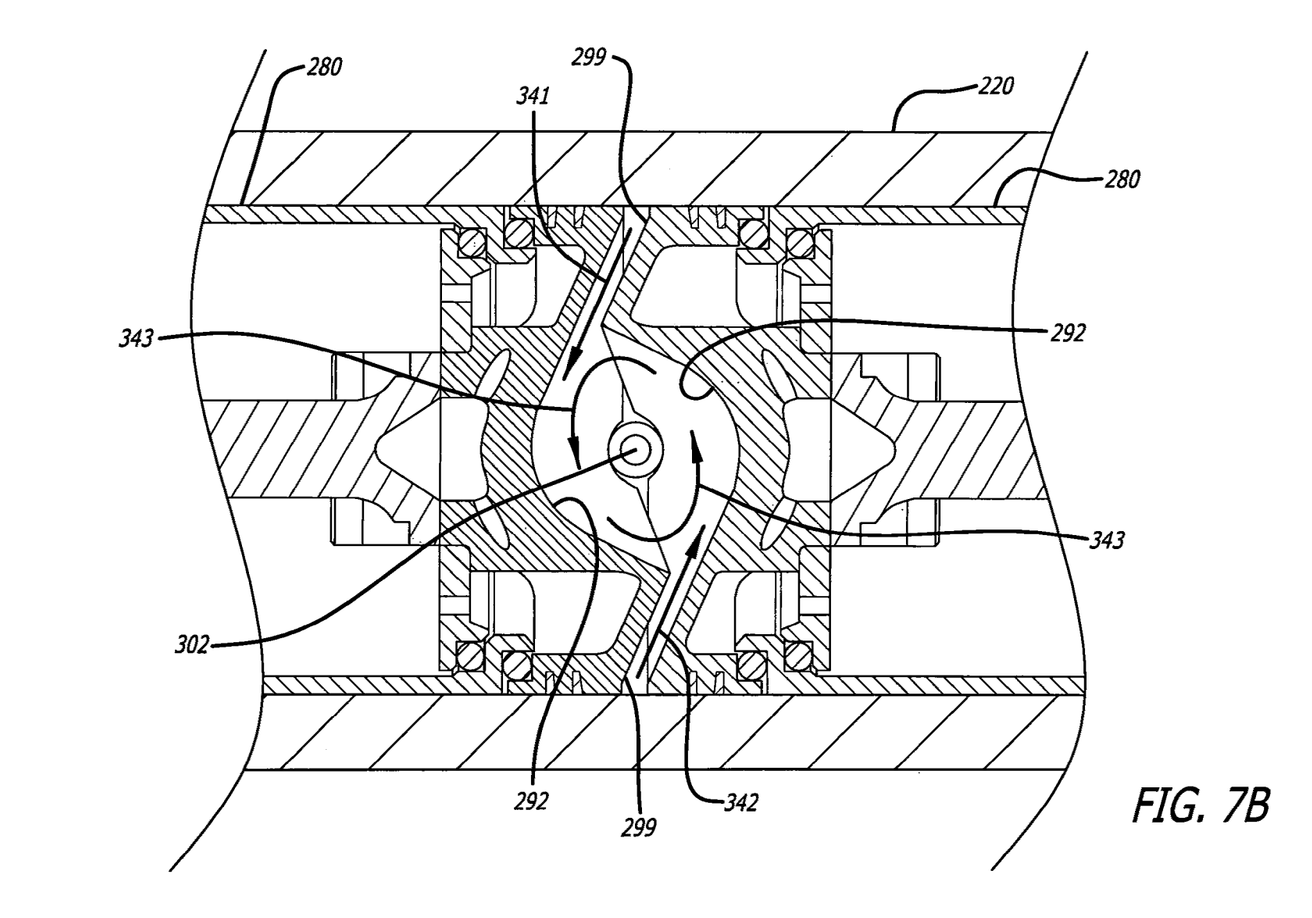
FIG. 7B is the enlarged view of FIG. 7A showing squish and tumble air flows in the combustion chamber construction

Referring now to FIGS. 4-6, the two pistons 280 having end surfaces shaped as per FIG. 3 are shown at or near respective BDC locations within the ported cylinder 220. The pistons are rotationally oriented in the bore of the cylinder 220 so as to align the end surfaces in complement; that is to say, the concave surface portion 290 of one piston 280 faces the convex surface 295 of the other piston. Charge air is forced through the intake port 224 into the cylinder, as exhaust products flow out of the cylinder through the exhaust port 226. For purposes of scavenging and air/fuel mixing, the charge air is caused to swirl as it passes through the intake port 224. As the pistons 280 move from BDC toward TDC as per FIG. 5, the intake and exhaust ports 224 and 226 close and the swirling charge air is increasingly compressed between the end surfaces 282. With reference to FIGS. 7A and 7B, as the pistons 280 approach TDC, compressed air flows from the peripheries of the end surfaces through squish channels 299 defined between the concave-convex surface pairs 290, 295. These squish airflows flow into a combustion chamber 300 having a cavity defined between the end surface bowls. At the same time, compressed charge air nearer the longitudinal axis of the cylinder continues to swirl. As the pistons 280 move through their respective TDC locations, the opposing concave-convex surfaces 290, 295 mesh with one another to give the combustion chamber cavity an elongated, generally ellipsoidal shape. Opposing pairs of notches 294 (see FIG. 3) in the end surfaces 282 define injection ports 303 (see FIG. 7A) that open into the combustion chamber 300 at opposing pole positions of the ellipsoidal shape. As per FIG. 8, the elongated, ellipsoidal shape has a major axis 302 that extends between the opposing pole positions. In other words, the injection ports 303 are aligned along the major axis 302.

Figure 9A:
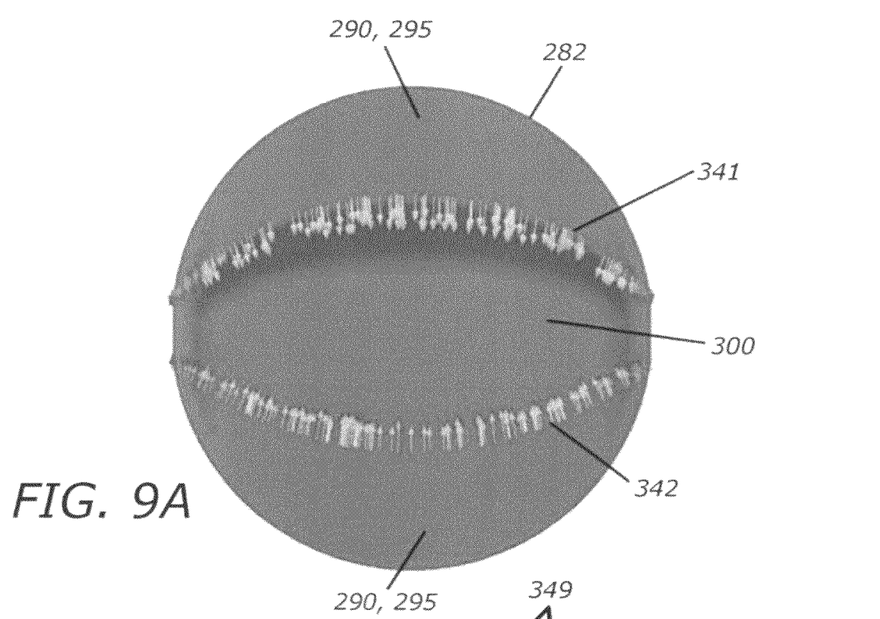
FIGS. 9A and 9B are schematic illustrations of the piston end surface view of FIG. 8 showing interaction between the end surface and squish flow, without swirl (FIG. 9A), and with swirl (FIG. 9B).
Figure 9B:
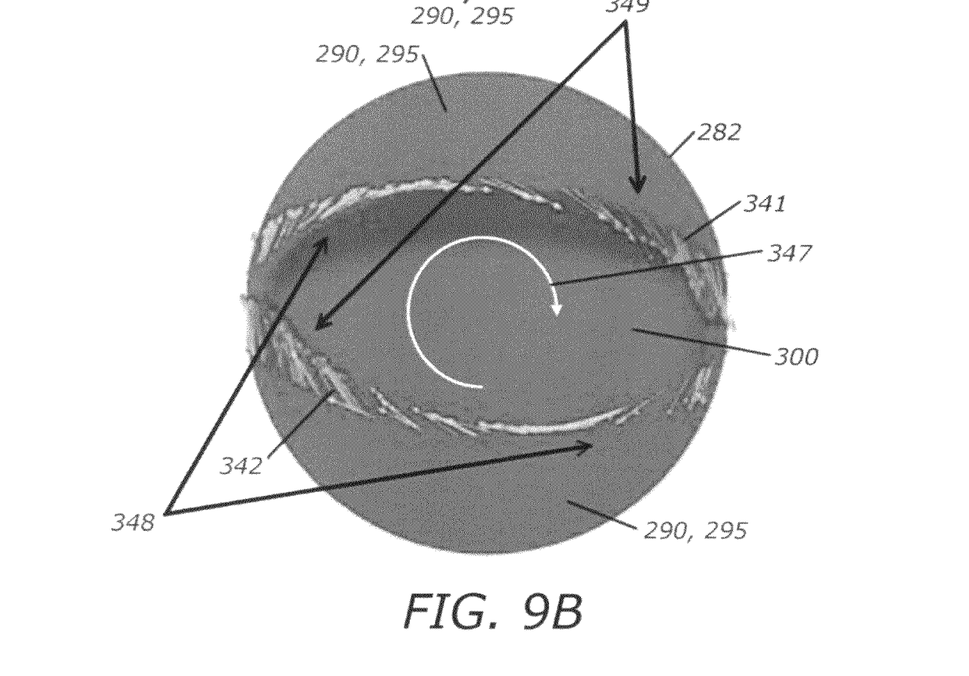

Interactions between the end surfaces 282 and charge air are illustrated in FIGS. 9A and 9B. FIG. 9A shows squish flows into the combustion chamber 300 without charge air swirl; FIG. 9B illustrates how the squish flows affect and are affected by swirl. As the pistons move toward TDC, squish regions (between opposing concave-convex surface pairs 290, 295) produce locally high pressure that directs squish flows of charge air into the central region of the combustion chamber 300. In this regard, with reference to FIGS. 7A, 7B and 9A, at the start of injection, when the pistons are near their respective TDC locations, the concave-convex surface pairs 290, 295 generate squish flows 341, 342 into the combustion chamber 300. As illustrated in FIG. 7B, these squish flows are oppositely-directed, parallel, and skewed with respect to the major axis 302. This spatial relationship causes generation of a tumbling motion 343 when the squish flows encounter the outwardly-directed end surface portions 292. In this regard, a tumbling motion is a circulating motion of charge air in the combustion chamber that is at least generally transverse to the longitudinal axis of the cylinder; in the case of the tumbling motion 343, the circulation is generally around the major axis 302. As per FIG. 9B, when swirl 347 is added to charge air motion, the swirling motion, depending on its intensity, counteracts or overcomes squish flow in the combustion chamber regions 348, and enhances the squish flow at the interface between the combustion chamber regions 349. These swirl-plus-squish interactions generate a more intense tumbling motion around the major axis 302 than do the squish flows alone. Modeling indicates that as the intensity of the initial swirl is increased, the intensity of this tumbling motion produced near TDC also increases. In addition, the swirl-plus-squish interactions with the end surfaces of the pistons in the combustion chamber 300 produce a second tumbling motion about an axis that is orthogonal to the major axis. For example, such an axis corresponds to, or is generally parallel to, the equatorial diameter of the elongated ellipsoidal shape. Thus, at the start of injection, the turbulent motion of the charge air in the combustion chamber 300 includes a swirl component, incoming squish flows, and tumble components about orthogonal tumble axes.

Figure 8:
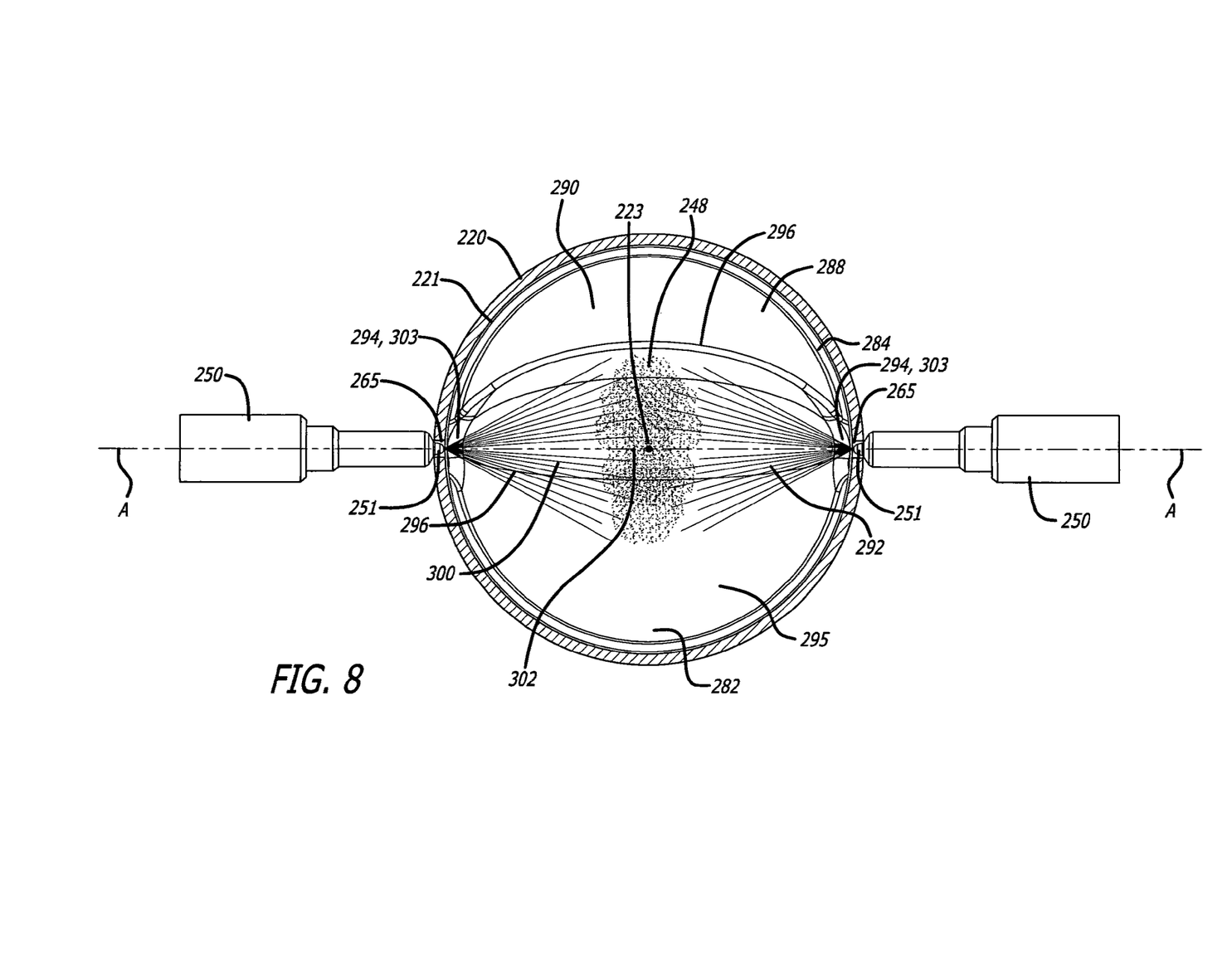
FIG. 8 is an end view of one of the pistons of FIG. 3 showing an end surface with a bowl formed therein and a pattern of fuel injection.

With reference to FIGS. 7A, 7B, and 8, fuel 248 is injected into the tumbling air in the combustion chamber space 300 by opposed injectors 250. The combustion chamber is essentially centered with respect to the longitudinal axes of the cylinder and the pistons. When the pistons are near TDC, the pairs of aligned notches 294 define injection ports 303 opening into the combustion chamber cavity 300. The injection ports 303 are located at or near respective ends of the combustion chamber, aligned with the major axis 302 thereof, and fuel is injected from two opposing injectors 250 through the injection ports so that the fuel 248 is confined between and guided by the opposing concave surface portions 292.

In some aspects, it is desirable to inject a pair of opposing sprays of fuel into the turbulent charge air motion generated in the combustion chamber by swirl-plus-squish interactions, where the opposing sprays approach the center of the combustion chamber and form a cloud of fuel that is well mixed with the compressed charge air due to the turbulence. With reference to FIG. 8, the view is a sectional one at or near the longitudinal midpoint of the cylinder 220, looking directly into the cylinder's bore 221 toward a piston end surface 282 disposed in the bore at a position where it and the unseen piston end surface define the combustion chamber 300. The cylinder's axis is indicated by reference numeral 223. In this construction, the combustion chamber 300 is essentially centered longitudinally with respect to the cylinder's axis 223. Fuel injectors 250 are positioned with their nozzle tips 251 disposed at injector ports 265. Each injector nozzle tip has one or more holes through which fuel 248 is injected through a respective injector port, into the combustion chamber 300. Preferably, each injector tip 251 sprays fuel 248 in a diverging pattern that is aligned with and travels through an injection port 303 along the major axis 302 of the ellipsoidal combustion chamber 300, into the central portion of the combustion chamber 300. Preferably, opposing spray patterns of fuel are injected into the turbulent air motion in the combustion chamber 300. In some aspects, the opposing spray patterns travel toward the center of the combustion chamber and form a cloud of fuel droplets that are mixed with charge air having a complex turbulent motion that includes swirl, squish, and tumble components. Preferably, but not necessarily, the fuel injectors 250 are disposed such that their axes A are in alignment with each other and a diametrical direction of the bore 221. This causes the injector tips to be oriented in opposition along a diameter of the cylinder 220 that is aligned with the major axis 302.

Fuel spray patterns: In order to amplify the advantages gained with a combustion chamber such as is described and illustrated above, it is desirable to provide fuel spray patterns that further enhance fuel vaporization and air/fuel mixing in the complex, turbulent charge air motion produced by those combustion chambers. The fuel spray patterns can be provided with one or more plumes, depending upon design and performance goal. However, spray patterns with multiple plumes are preferred because they expose the injected fuel quantity to a larger portion of oxygen in the combustion chamber, and lead to less fuel-rich regions and lower soot production. The fuel spray patterns are produced by injectors that are mounted for opposing direct side injection and that include nozzles in which the holes are placed to independently project respective plumes of a spray pattern.

Figure 10A:
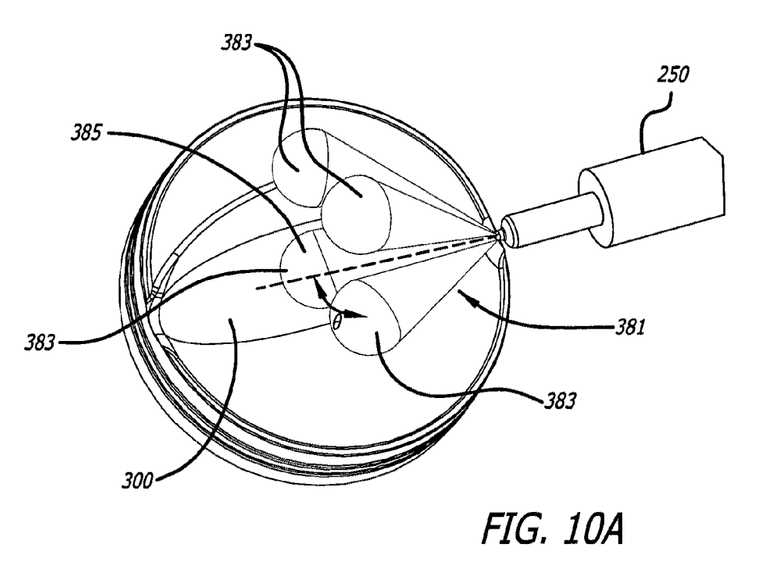
FIG. 10A is an explanatory diagram for describing a fuel injection spray pattern with multiple plumes.
Figure 10B:
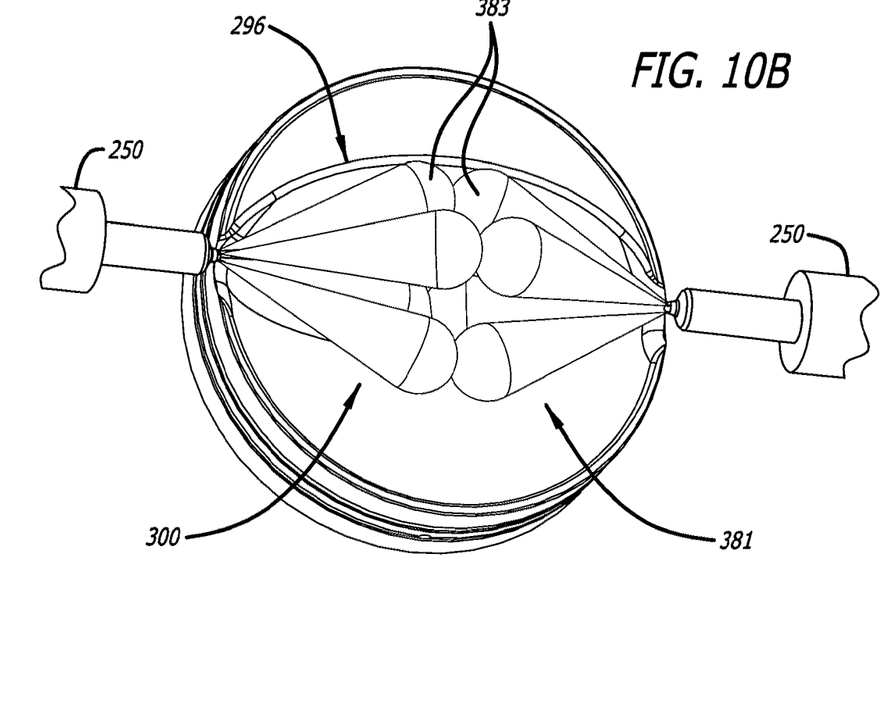
FIG. 10B is an explanatory diagram for describing a first embodiment of a fuel injection spray pattern with multiple plumes.
Figure 10C:
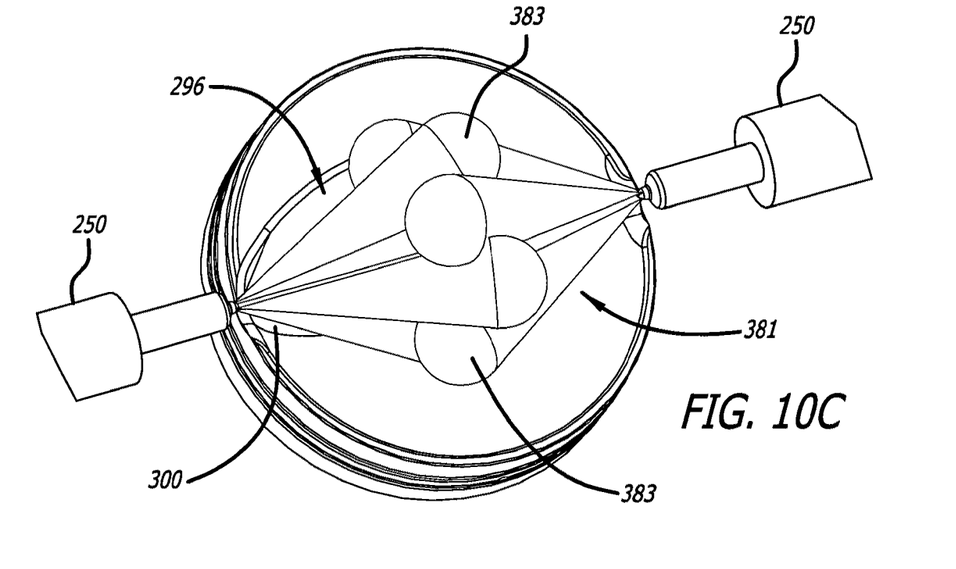
FIG. 10C is an explanatory diagram for describing a second embodiment of a fuel injection spray pattern with multiple plumes

FIGS. 10A, 10B, and 10C illustrate opposing fuel spray patterns, however, these patterns are meant only to be representative of opposing spray patterns that are injected into the combustion chamber 300. For clarity, a single representative spray pattern 381 is shown in FIG. 10A, so as to be able to see properties common to both patterns. As per FIG. 10A, the spray pattern 381 includes a plurality of plumes 383 distributed in an arrangement referenced to an injection axis 385; in this regard, the plumes are arcuately spaced with respect to each other, and are inclined with respect to the injection axis 385. The precise configuration of a spray pattern is determined according to design and/or performance requirements. Accordingly, it is within the scope of this description to vary one or more of the following parameters in the specifications of opposing spray patterns: the number of plumes, the arcuate spacing between the plumes, the angles of inclination, and the relationship of the injection axes.

In the example shown in FIGS. 10A, 10B, and 10C, each spray pattern has a generally conical configuration defined by four plumes 383 that are arcuately spaced at 90°, with each plume 383 inclined at an angle in a range of 10°-30° with respect to the injection axis 385; for example, all of the plumes are inclined at 20° with respect to the injection axis 385. Preferably, the injection axes 385 of the two opposing spray patterns are aligned with respective opposing radial directions of the cylinder bore; that is to say the axes are aligned along a diameter of the bore. In one spray pattern example shown in FIG. 10B, the opposing spray patterns are rotationally aligned so that the plumes are oriented in opposition near the center of the bore; in another example, shown in FIG. 10C, the opposing spray patterns are mutually rotationally offset so that the plumes are interdigitated. The fuel injectors 250 can be configured and/or positioned so as to provide opposing spray patterns having any rotational relationship between the two alignments seen in FIGS. 10B and 10C. Using the example illustrated in FIGS. 10A-10C, the opposing four-plume spray patterns can be rotationally offset in a range of 0°-45°, such that, when the rotational offset of the spray patterns is 0° (FIG. 10B), the plumes of one spray pattern are in opposition with corresponding plumes of the opposing spray pattern, and, when the rotational offset of the spray patterns is 45° (FIG. 10C), the plumes of one spray pattern are interdigitated with the plumes of the opposing spray pattern.

The combustion chamber construction illustrated and described hereinabove is intended to be utilized in opposed-piston combustion-ignition engines which impose swirl on the charge of air forced into the cylinder. Nevertheless, the combustion chamber construction can be utilized in those opposed-piston combustion-ignition engines that do not swirl the charge air.

The pistons and associated cylinder are manufactured by casting and/or machining metal materials. For example, the pistons may be constituted of a skirt assembled to a crown on which a piston end surface is formed. As a further example, but without excluding other materials, the crown may comprise a high carbon steel such as 41-40 or 43-40, and the skirt may be formed using 4032-T651 aluminum. In such cases, the cylinder preferably; but not necessarily, comprises a cast iron composition.

Although the invention has been described with reference to preferred constructions, it should be understood that various modifications can be made without departing from the spirit of the invention. Accordingly, the invention is limited only by the following claims.

The invention claimed is:

1. A method for operating an internal combustion engine including at least one cylinder with an exhaust port longitudinally-separated from an intake port, a pair of pistons disposed in opposition to one another in a bore of the cylinder, and a combustion chamber defined in the bore between end surfaces of the pistons, in which charge air is admitted into the bore from the intake port as the pistons move from respective bottom dead center positions in the bore, an elongated, ellipsoidal combustion chamber is formed between bowls on the end surfaces of the pistons, a tumble component is added to the motion of the air in the combustion chamber, and spray patterns of fuel are injected into the combustion chamber in opposing radial directions of the cylinder.

2. The method of claim 1, wherein the tumble component is added to the motion of the air as the pistons approach top dead center positions in the bore.

3. The method of claim 2, in which each spray pattern includes a plurality of plumes disposed in an array with respect to an axis of injection.

4. The method of claim 3, in which the spray patterns are rotationally oriented so as to orient the plumes of the spray patterns in opposition.

5. The method of claim 3, in which the spray patterns are rotationally oriented so that the plumes of the spray patterns are interdigitated.

6. The method of claim 1, wherein the charge air is swirled as it is admitted into the bore, and the tumble component is added to a swirling motion of the air as the pistons approach top dead center positions in the bore.

7. The method of claim 6, in which each spray pattern includes a plurality of plumes disposed in an array with respect to an axis of injection.

8. The method of claim 7, in which the spray patterns are rotationally oriented so as to orient the plumes of the spray patterns in opposition.

9. The method of claim 7, in which the spray patterns are rotationally oriented so that the plumes of the spray patterns are interdigitated.

10. A method for operating an internal combustion engine including at least one cylinder with an exhaust port longitudinally-separated from an intake port, and a pair of pistons disposed in opposition to one another in a bore of the cylinder, by admitting air into the bore through the intake port as the pistons move from respective bottom dead center positions in the bore, moving opposing bowls on the opposing end surfaces of the pistons together to define a combustion chamber having an elongated, ellipsoidal shape, causing a tumbling motion in the charge of air between opposing end surfaces of the pistons as the pistons move toward respective top dead center positions in the bore, and side-injecting opposing spray patterns of fuel into the charge air between the opposing end surfaces.

11. The method of claim 10, in which injecting a charge of fuel into the charge of air includes injecting the fuel along a major axis of the combustion chamber.

12. The method of claim 10, in which each spray pattern includes a plurality of plumes disposed in an array with respect to an axis of injection.

13. The method of claim 12, in which the spray patterns are rotationally oriented so as to orient the plumes of the spray patterns in opposition.

14. The method of claim 12, in which the spray patterns are rotationally oriented so that the plumes of the spray patterns are interdigitated.

15. The method of claim 10, in which a swirling motion is imposed on the air admitted into the bore.

16. The method of claim 15, including the elongated, ellipsoidal shape having a major axis.

17. The method of claim 16, in which injecting a charge of fuel into the charge of air includes injecting the fuel along the major axis.

18. The method of claim 17, in which each spray pattern includes a plurality of plumes disposed in an array with respect to an axis of injection.

19. The method of claim 18, in which the spray patterns are rotationally oriented so as to orient the plumes of the spray patterns in opposition.

20. The method of claim 18, in which the spray patterns are rotationally oriented so that the plumes of the spray patterns are interdigitated.

21. A method for operating an internal combustion engine including at least one cylinder with longitudinally-separated exhaust and intake ports, and a pair of pistons disposed in opposition for reciprocating in a bore of the cylinder, by forming a combustion chamber having an elongated, ellipsoidal shape between the end surfaces of the pistons as the pistons move toward respective top dead center positions in the bore, providing squish flows of charge air into the combustion chamber in directions that are skewed with respect to a major axis of the elongated ellipsoidal shape, generating at least one tumbling motion of charge air in the combustion chamber in response to the squish flows and swirling charge air, and injecting opposing spray patterns of fuel into the combustion chamber.

22. The method of claim 21, in which injecting opposing spray patterns of fuel into the combustion chamber includes injecting the spray patterns of fuel along the major axis.

23. The method of claim 22, in which each spray pattern includes a plurality of plumes disposed in an array with respect to an axis of injection.

24. The method of claim 23, in which the spray patterns are rotationally oriented so as to orient the plumes of the spray patterns in opposition.

25. The method of claim 24, in which the plumes include four plumes.

26. The method of claim 23, in which the spray patterns are rotationally oriented so that the plumes of the spray patterns are interdigitated.

27. The method of claim 26, in which the plumes include four plumes.

28. The method of claim 23, in which the spray patterns are rotationally oriented in a range between an orientation in which the plumes of the spray patterns in opposition and an orientation in which the plumes of the spray patterns are interdigitated.

* * * * *